United States Patent
Tanaka et al.

(10) Patent No.: US 6,818,037 B2
(45) Date of Patent: Nov. 16, 2004

(54) FILTER ELEMENT

(75) Inventors: Seiichi Tanaka, Saitama (JP); Kazutaka Yokoyama, Saitama (JP); Hiroto Koura, Hyogo (JP); Tsumoru Okada, Hyogo (JP); Shinsuke Mizuta, Hyogo (JP)

(73) Assignees: Honda Giken Kogyo Kabushiki Kaisha, Tokyo (JP); Tigers Polymer Corporation, Osaka (JP)

( * ) Notice: Subject to any disclaimer, the term of this patent is extended or adjusted under 35 U.S.C. 154(b) by 16 days.

(21) Appl. No.: 10/302,935

(22) Filed: Nov. 25, 2002

(65) Prior Publication Data

US 2003/0106293 A1 Jun. 12, 2003

(30) Foreign Application Priority Data

Nov. 26, 2001 (JP) .......................... 2001-359772

(51) Int. Cl.[7] .......................... B01D 27/06; B01D 29/07; B01D 46/10
(52) U.S. Cl. .......................... 55/487; 55/385.3; 55/488; 55/497; 55/521; 55/524; 55/527; 55/DIG. 5; 55/DIG. 24
(58) Field of Search .......................... 55/385.3, 482, 55/486–488, 497, 503, 521, 524, 527, 528, DIG. 24, DIG. 5

(56) References Cited

U.S. PATENT DOCUMENTS 4,886,527 A * 12/1989 Fottinger et al. ............... 95/78
4,976,858 A * 12/1990 Kadoya ....................... 210/496
5,082,476 A * 1/1992 Kahlbaugh et al. ........... 95/287
5,171,342 A * 12/1992 Trefz ............................ 55/487
5,437,701 A * 8/1995 Townsley ..................... 55/486
5,730,770 A * 3/1998 Greisz ........................ 55/385.6
5,792,227 A * 8/1998 Kahlbaugh et al. ........... 55/486
5,820,645 A * 10/1998 Murphy, Jr. ................ 55/385.3
6,315,805 B1 * 11/2001 Strauss ......................... 55/486
6,488,731 B2 * 12/2002 Schultheiss et al. ......... 55/486
6,652,748 B1 * 11/2003 Choi .......................... 210/232
2001/0035094 A1 * 11/2001 Takagaki et al. .............. 96/154
2003/0046913 A1 * 3/2003 Suzuki et al. ................. 55/486
2003/0150199 A1 * 8/2003 Tanaka et al. ................. 55/486

FOREIGN PATENT DOCUMENTS

JP       10-85539        4/1998

* cited by examiner

Primary Examiner—Robert H. Spitzer
(74) Attorney, Agent, or Firm—Oblon, Spivak, McClelland, Maier & Neustadt, P.C.

(57) ABSTRACT

A filter element is made of a first filtering member, and a second filtering member that is arranged on a downstream side of the first filtering member and is impregnated with an oil. The first filtering member consists of a downstream wet layer that is impregnated with the oil, which is transferred by contact to the second filtering member, and an upstream dry layer that is not impregnated with the oil. A density of the first filtering member may be set smaller than that of the second filtering member.

19 Claims, 1 Drawing Sheet

FILTER ELEMENT

BACKGROUND OF THE INVENTION

1. Field of the Invention

The present invention relates to a filter element that is capable of collecting carbon dusts effectively and is useful as an air cleaner, etc. of a car, an internal combustion engine, etc.

2. Description of the Prior Art

In the power source of the car, the motor bicycle, etc., the clean air is supplied to the engine by collecting the dusts by virtue of the filter element of the air cleaner in the suction system of the engine.

In recent years, the filtering function of adsorbing and filtering the dusts, a particle size distribution of which extends over a wide range from the dust with a large particle size such as a cloud of sand to the dust with a small particle size such as the carbon particle contained in the exhaust gas from the diesel car, etc. (referred to as the "carbon dust" hereinafter), is required of the filter element. Also, performances such as excellent dust holding capacity (long filtering lifetime), small pressure loss, etc. are required of the filter element while maintaining a high cleaning efficiency.

In order to satisfy these requirements, the wet type filter that is formed of the filter paper or nonwoven fabric impregnated with the viscous oil and has a ridge-like-folded structure, for example, is employed. Also, the dry type filter that is formed of the filter paper, nonwoven fabric, or the like, which does not contain the oil, is employed.

As the dry type filter, in Patent Application Unexamined Publication (KOKAI) Hei. 10-85539, the filter element consisting of the main filter, which is formed of the ridge-like-folded nonwoven fabric, and the pre-filter, which is arranged on the upstream side of this main filter and formed of the nonwoven fabric, are disclosed. This filter element can improve the dust holding capacity by increasing the bulk of the pre-filter. However, the filter element cannot sufficiently increase the dust holding capacity although the expensive nonwoven fabric is used. Therefore, such filter element is disadvantageous to industrial use from the respect of cost-effectiveness. In addition, if it is tried to implement the excellent dust cleaning efficiency by the dry type filter, the bulk of the filter is increased even after the improved structure such as the ridge-like-folded structure, etc. to increase the adsorption area is employed, and thus it is difficult to get the compact filter element.

In contrast, in the wet type filter, since the viscous oil on the surface of the filter can catch the dusts, the dust absorbing amount per volume of the filter can be increased, and thus reduction in size of the filter can be attained. Also, the clogging due to the dust is hard to occur and also the high cleaning efficiency can be attained. In addition, the wet type filter has such a feature that the lifetime of the wet type filter is longer than the dry type filter. However, in the wet type filter, it is known that the carbon dusts, which are caught by the oil in the filter, get out of the filter, and thus the carbon dust cannot be effectively collected.

SUMMARY OF THE INVENTION

Therefore, it is an object of the present invention to provide a filter element having improved characteristic as being compared with the conventional filter element. In particularly, it is an object of the present invention to provide a filter element that has a high dust cleaning efficiency and a high dust holding capacity and also has a long filtering lifetime.

It is another object of the present invention to provide a filter element that is capable of improving a carbon dust cleaning efficiency, and also has a small pressure loss and a low cost.

In order to attain the above subjects, as the result of earnest studies, the inventors of the present invention have found that, if a filtering member that is not impregnated with an oil and a filtering member that is impregnated with an oil are formed in specific order, the filter element whose dust (particularly, carbon dust) cleaning efficiency can be improved, whose dust holding capacity can be enhanced, and whose filtering lifetime can be extended long can be implemented at a low cost, and have completed the present invention.

More particularly, a filter element of the present invention comprises a first filtering member, and a second filtering member that is arranged on a downstream side of the first filtering member and is impregnated with the oil, wherein the first filtering member consists of a downstream wet layer that is impregnated with the oil, which is transferred by contact to the second filtering member, and an upstream dry layer that is not impregnated with the oil.

In the above filter element, the dry layer of the first filtering member, which is not impregnated with the oil, collects mainly the carbon dust, and the wet layer, which is impregnated with the oil, adsorbs the dusts that passed through the dry layer and have a relatively large particle size, and also the second filtering member adsorbs the dusts that passed through the first filtering member. Therefore, the dust holding capacity of the overall filter can be extremely increased.

In such filter element, the oil that exists on the side at which the second filtering member comes into contact with the first filtering member is transferred to the first filtering member. As a result, the concentration gradient of the oil occurs in the overall filtering members. Thus, the presence of the oil is effective to collect the dust. However, if the oil is present excessively, lumps of the dust are formed at oil-excessive portions to cause the clogging. In contrast, if the concentration gradient that is reduced gradually from the downstream side to the upstream side is formed, such concentration gradient is effective to prevent the clogging.

A density of the first filtering member may be set smaller than a density of a filtering member constituting the second filtering member. If the density of the first filtering member is relatively smaller than the second filtering member, the clogging due to the dust can be delayed. The density of the first filtering member may be set uniformly as a whole, or may be reduced continuously or stepwise from the upstream side to the downstream side. For example, if the first filtering member has a tissue whose density is changed from a dense density to a coarse density from the upstream side (air intake side), the carbon dust can be caught and held effectively at the high-density area on the upstream side. The second filtering member may be shaped into an appropriate shape, e.g., a ridge-like-folded structure, or the like. Filtering members constituting the first filtering member and the second filtering member are formed of at least one of a filter paper and a nonwoven fabric respectively. For example, the filtering member constituting the first filtering member is formed of the nonwoven fabric, and the filtering member constituting the second filtering member is formed of the filter paper. It is possible to collect effectively the carbon dust if the first filtering member is formed of at least one of the filter paper and the nonwoven fabric, while the excellent dust adsorbing/holding capabilities can be achieved as the wet type filter if the second filtering member is formed of at least one of the filter paper and the nonwoven fabric, which are impregnated with the oil.

DETAILED DESCRIPTION OF THE PREFERRED EMBODIMENTS

Figure 1:
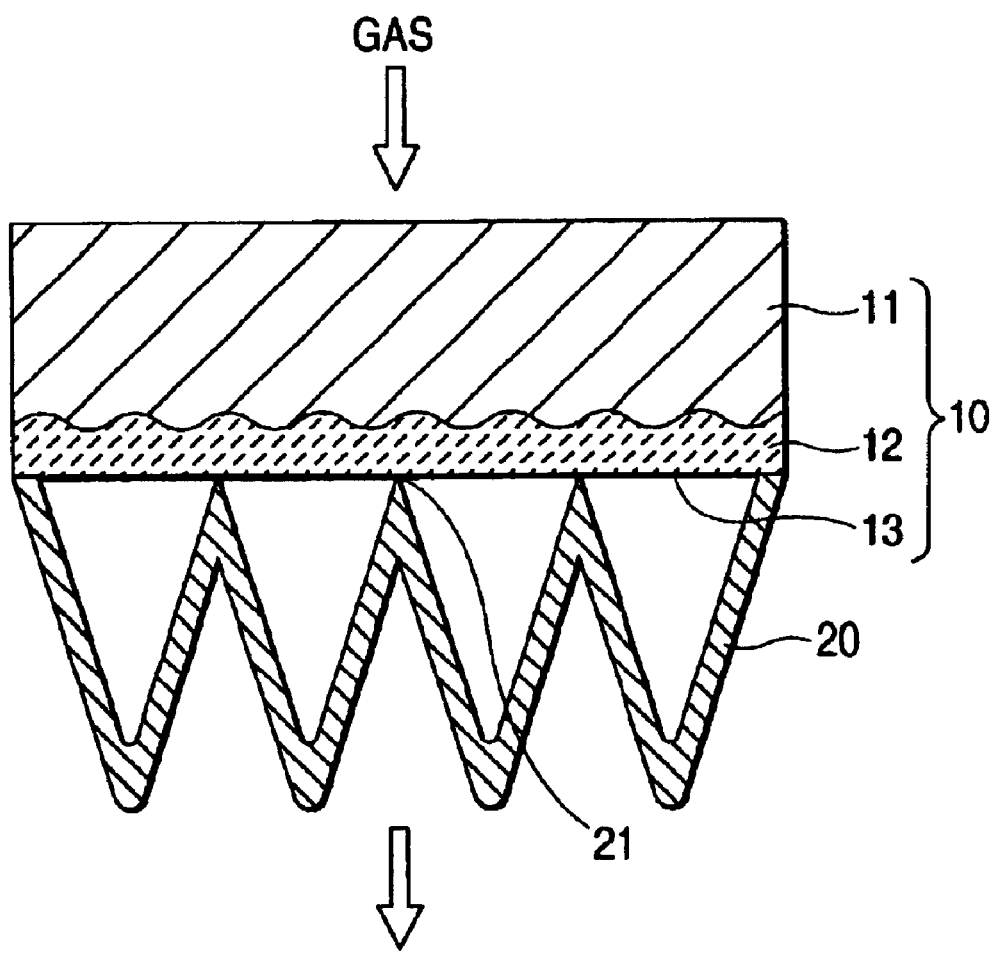
FIG. 1 is a schematic sectional view showing an example of a filter element according to the present invention.

The present invention will be explained in detail hereinafter while referring to the accompanying drawings as occasion demands.

[Filter Element]

FIG. 1 is a schematic sectional view showing a filter element according to the present invention. In this example, the filter element consists of a flat plate-like filtering member (first filtering member) 10 that is formed of the nonwoven fabric (e.g., polyester-fiber nonwoven fabric, or the like), and a filtering member (second filtering member) 20 that is formed of the filter paper impregnated with the oil (e.g., viscous oil, or the like) and has a ridge-like-folded structure having a folded sectional shape. The first filtering-member 10 is arranged on the upstream side (gas intake side) of the second filtering member 20. Folded portions (top portions) 21 of the second filtering member 20, which are arranged on the downstream side (gas exhaust side), come into contact with a surface 13 of the first filtering member 10 on the downstream side.

Then, the first filtering member 10 consists of an upstream dry layer 11 that is not impregnated with the oil and a downstream wet layer 12 that is impregnated with the oil that is transferred or permeated by the contact with the second filtering member 20.

Also, the density of the filtering member (nonwoven fabric) constituting the first filtering member 10 is reduced toward the downstream side from the upstream side. For example, the filtering member is composed of a high density layer (e.g., void fraction of 90%, thickness of about 6 mm) and a low density layer (e.g., void fraction of 95%, thickness of about 12 mm) from the upstream side.

In addition, the density of the filtering member constituting the first filtering member 10 is formed smaller than that of the filtering member constituting the second filtering member 20. For example, the void fraction of the first filtering member 10 is almost 98%, and the void fraction of the second filtering member 20 is almost 83%.

In the filter element having such structure, first mainly the carbon dusts in the gas flow, indicated by an arrow in FIG. 1, can be collected by the dry layer 11 of the first filtering member 10. Then, the dusts with a large particle size, which have passed through the dry layer 11, can be adsorbed/held by the wet layer 12. Then, the dusts that have passed through the wet layer 12 can be adsorbed/held without fail by the second filtering member 20. In addition, not only the clogging caused when the dusts are deposited concentratedly on the upstream side can be prevented since the density of the first filtering member 10 is lower as a whole than that of the filtering member constituting the second filtering member 20, but also such filter element is excellent in carbon dust collecting and holding performances since the density of the first filtering member 10 on the upstream side is relatively high. Therefore, the filter element of the present invention can collect various dusts, which have a wide particle size distribution, from the dusts with a small particle size such as the carbon dust, or the like to the dusts with a large particle size such as the cloud of sand, or the like, in such a manner that the dusts are distributed stepwise and selectively. As a result, the dust adsorbing capability of the overall filter element can be exhibited to its maximum. Also, in the present invention, the oil can be transferred to the first filtering member only by bringing the first filtering member into contact with the second filtering member, and thus the wet layer can be formed simply.

In this case, opposite alignment to the filter element of the present invention, i.e., sequential alignment of the wet filtering member, which is impregnated with the oil, and the dry filtering member, which is not impregnated with the oil, from the upstream side to the downstream side, may be considered. However, in the filter element having such a structure, all dusts are taken easily into the oil of the wet filtering member irrespective of the particle size. Thus, the wet filtering member is contaminated in a short time and also the filtering performance is degraded in its early stages. Therefore, it is difficult to improve the filtering performance as a whole, and thus the carbon dusts cannot be effectively collected for a long time.

No particular limitation is imposed on the filtering members constituting the first filtering member and the second filtering member as far as they have the filtering function. For example, a member having a tissue in which the fibers are confounded at random (manufactured paper or web structure or tissue), e.g., filter paper, nonwoven fabric, etc. can be employed. These filtering members may be used solely or in combination.

As the fiber constituting the filter paper or the nonwoven fabric, there may be listed cellulose fiber and natural fiber such as pulp (wood pulp, linter pulp, etc.), etc., for example, synthetic fiber [e.g., polyolefin fiber ($polyC_{2-4}$olefin fiber such as polyethylene fiber, polypropylene fiber, etc.), acrylic fiber, polyester fiber (polyalkylene terephthalate fiber such as polyethylene terephthalate (PET), polybutylene terephthalate (PBT), etc., total aromatic polyester fiber, etc.), polyamide fiber (containing aromatic polyamide fiber such as aramid fiber, etc.), rayon fiber, etc.], inorganic fiber (glass fiber, metal fiber, ceramic fiber, carbon fiber, etc.), etc. These fibers may be used solely or in combination.

Out of these filtering members, the preferable first filtering member is the nonwoven fabric (nonwoven fabric made of the synthetic fiber, etc.) and the preferable filtering member constituting the second filtering member is the filter paper that has a porous structure, into which the oil is ready to enter, and has a high dust collecting efficiency at low cost.

In this case, the nonwoven fabric can be formed by the common method, e.g., wet nonwoven fabric, dry nonwoven fabric, spun-bond nonwoven fabric, melt-blow nonwoven fabric, or the like.

The densities of the filtering members constituting the first filtering member and the second filtering member may be set substantially equal to each other. Otherwise, the density of the first filtering member may be set larger or smaller than that of the filtering member constituting the second filtering member. Normally the density of the first filtering member is set smaller than that of the filtering member constituting the second filtering member. For instance, the bulk density of the first filtering member is set to 0.1 to 0.8 $g/cm^3$, preferably 0.2 to 0.7 $g/cm^3$, and more preferably 0.2 to 0.5 $g/cm^3$, for example, and also the bulk density of the filtering member constituting the second filtering member is set to 0.3 to 0.9 $g/cm^3$, preferably 0.4 to 0.8 $g/cm^3$, and more preferably 0.5 to 0.7 $g/cm^3$, for example. Also, the void fraction of the first filtering member is set to 50 to 99%, preferably 70 to 99%, and more preferably 80 to 99%, for example, and also the void fraction of the filtering member constituting the second filtering member is set to 30 to 99%, preferably 50 to 95%, and more preferably 70 to 90%, for example.

In this case, the grammage (weight per unit area) of the first filtering member is set to 50 to 5000 g/m$^2$, preferably 100 to 3000 g/m$^2$, and more preferably 500 to 2000 g/m$^2$, for example, and also the grammage (weight per unit area) of the filtering member constituting the second filtering member is set to 10 to 2500 g/m$^2$, preferably 25 to 1000 g/m$^2$, and more preferably 50 to 800 g/m$^2$, for example.

Also, the density of the filtering member constituting the first filtering member may be set uniformly on the whole. Otherwise, the density of such filtering member may be decreased or increased gradually along the direction from the upstream side to the downstream side. In the preferred mode, normally the density is reduced continuously or stepwise from the upstream side to the downstream side.

The filtering member whose density is changed continuously may have the density gradient that is changed from the low void fraction to the high void fraction (e.g., the density gradient that is changed from the void fraction of about 95% to the void fraction of about 80%) from the upstream side to the downstream side, for example. The density gradient can be formed from the upstream side to the downstream side by the density adjusting means (e.g., means for adjusting the entering degree of the needle punch), for example.

The filtering member whose density is changed stepwise may have plural different void fractions (e.g., the-void fractions of about 95% and about 85%) from the upstream side to the downstream side, for example. In the filtering member whose density is changed stepwise, the density may be changed by laminating the filtering members having plural different void fractions, or the void fraction may be changed stepwise in the single filtering member, for example.

As for thicknesses of the filtering members constituting the first filtering member and the second filtering member, the thickness of the first filtering member is set to about 5 to 50 mm, preferably about 10 to 30 mm, and more preferably about 15 to 25 mm, for example, and the thickness of the filtering member constituting the second filtering member is set to about 0.1 to 10 mm, preferably about 0.5 to 7 mm, and more preferably about 1 to 5 mm, for example.

The shapes of the filtering members constituting the first filtering member and the second filtering member are not particularly limited. Such shapes may be formed as a two-dimensional structure such as a sheet structure, a flat plate structure, or the like, or a three-dimensional structure such as a cylindrical structure, bent or curved (or corrugated) structure, ridge-like-folded structure, or the like. In addition, the filtering member may be formed like the unevenness by the embossing. These structures may be used solely or in combination. The preferable shape to enhance a specific surface area is the bent or curved (or corrugated) structure, or the ridge-like-folded structure. In the case of the filtering member made of the nonwoven fabric, normally two-dimensional structure such as a sheet structure, a flat plate structure, or the like, which can be formed simply at low cost in industrial use, is preferable.

In this case, since the oil can be transferred or permeated from the second filtering member to the first filtering member, the first filtering member and the second filtering member may come into contact with each other at least partially. For example, the structure in which the first filtering member is separated partially from the second filtering member may be employed like the filter element shown in FIG. 1, or the structure in which the first filtering member is laminated or superposed integrally with the second filtering member (e.g., the overall filter element is formed as the ridge-like laminated structure or the flat-plate-like laminated structure) may be employed.

A ratio of the wet layer to the entire first filtering member (volume ratio or thickness ratio) may be set to less than 30% (e.g., about 1 to 25%), preferably less than20% (e.g., about 3 to 15%), and preferably less than 10% (e.g., about 5 to 10%), for example.

In this case, the thickness of the wet layer to the entire first filtering member may be set uniformly or ununiformly. Also, normally the concentration of the oil has a gradient that is increased gradually from the upstream side to the downstream side.

The oil that is to be permeated into the filtering member constituting the second filtering member is not particularly limited as far as its retention for the dust such as the carbon dust, etc. is not spoiled. The normal air filter oil (high viscosity oil) can be employed.

As the oil component, there may be listed petroleum oil (e.g., naphthene oil, paraffin oil, liquid paraffin, etc.), synthetic hydrocarbon oil (e.g., polybutene, olefin polymerized oil such as poly($\alpha$-olefin), alkylbenzene, alkyl naphthalene, synthetic naphthene, etc.), aliphatic ester (e.g., alkylester of polyhydric carboxylic acid such as dialkyl ester of $C_{6-12}$alkane dicarboxylic acid, polyol ester, etc.), polyglycol (e.g., polyalkylene glycol, etc.), phenyl ether (e.g., alkyldiphenyl ether, etc.), phosphate (e.g., aromatic phosphate, aliphatic phosphate, etc.), silicon oil (e.g., poly (dimethylsiloxane), poly(phenyl methylsiloxane), silicate, etc.), etc.

The oil component may contain various additives, e.g., viscosity regulator, viscous agent, adhesives, high boiling solvent (e.g., mineral oil), antioxidant (e.g., thermal antioxidant, oxidation inhibitor, ultraviolet absorbent, etc.), filler (containing the pigment), etc. as the case may be.

The viscosity of the oil measured by the rotating viscometer is set to about 1 to 10000 poise (ps), preferably about 10 to 7000 ps, and more preferably about 10 to 5000 ps (e.g., 1000 to 3000 ps) at the temperature of 20° C., for example.

An amount of oil contained in the filtering member constituting the second filtering member is set to about 30 to 300 wt %, preferably about 50 to 250 wt %, and more preferably about 80 to 200 wt % with respect to the filtering member of 100 wt %, for example.

A concentration of the oil with respect to the filtering member constituting the second filtering member may be set uniformly or ununiformly. Normally the concentration of the oil is substantially uniform before the oil in the second filtering member is transferred to the first filtering member, but the oil has the concentration gradient that is increased gradually from the upstream side to the downstream side after the oil is transferred to the first filtering member.

In this case, the common method such as a spraying method, a dipping method, or the like, for example, may be employed as the oil impregnating method. If necessary, in order to increase the permeability to the filtering member, the high-viscosity oil that is diluted by the solvent may be impregnated in the filtering member and then the solvent may be removed. In addition, the viscosity of the oil may be lowered by the heating to improve the impregnating efficiency.

[Processed Gas]

The filter element of the present invention is useful to process the processed gas (e.g., air, exhaust gas, etc.) containing fine grains (e.g., cloud of sand, ash such as volcanic ash, carbon dust, etc.), particularly the carbon dust. Also, this filter element is useful to process the processed gas, which contains particles having the almost same particle size as the carbon dust (several nm to 200 nm (e.g., about 3 to 500 nm)), as well as the carbon dust. Therefore, this filter element is available for various applications, for example, air filter, emission regulation filter, etc. for internal combustion engine (e.g., car engine, etc.), compressor, etc.

According to the present invention, not only the dust cleaning efficiency can be increased but also the dust holding capacity can be increased, and thus the filter element having a long filter lifetime can be implemented. Also, the carbon dust cleaning efficiency can be enhanced and also the filter element having a small pressure loss and a low cost can be implemented.

EXAMPLE

The present invention will be explained in more detail with reference to an example hereunder. But the present invention is not limited by the example.

EXAMPLE

The filter element shown in FIG. 1 was obtained by arranging the second filtering member [viscous filter paper folded like the ridges (oil amount: 130 g/54 g, kinematic viscosity of oil: 32.6 mm$^2$/s)] on the downstream side of the first filtering member [type (material) of nonwoven fabric: polyethylene terephthalate (PET), thickness: 18 mm, grammage: 365 g/m$^2$]. This filter element was arranged so as to direct the first filtering member side toward the upstream side to accept the air-flow resistance test, the cleaning efficiency test, and the dust holding capacity test.

COMPARATIVE EXAMPLE

The second filtering member similar to the example was used as the filter element to accept the air-flow resistance test, the cleaning efficiency test, and the dust holding capacity test.

The air-flow resistance test, the cleaning efficiency test, and the dust holding capacity test were applied to the filter elements in the example and the comparative example based on JIS D1612 (car air cleaner test method). Measuring items and testing conditions of respective tests will be given hereunder.

[Air-Flow Resistance Test]

An initial air-flow resistance value (initial pressure loss) was measured under the following test conditions.

Tested dust: JIS-8 dust [dust of eighth type (fine grain) defined by JIS Z 8901 (tested dust), dust density: 0.12 g/m$^3$], carbon dust [lamp black (light oil burnt carbon), dust density: 9×10$^{-3}$ g/m$^3$]

Effective filtering area of the filter element: 0.432 m$^2$

Dust supply amount: 1.0 g/min

Air speed: 19.2 m/min

Test flow rate: 8.3 m$^3$/min

[Cleaning Efficiency Test]

The cleaning efficiency test was carried out under the same test conditions as the air-flow resistance test, and an initial cleaning efficiency and a full-life cleaning efficiency were detected.

The initial cleaning efficiency and the full-life cleaning efficiency were detected with respect to JIS-8 dust. The full-life cleaning efficiency was detected with respect to the carbon dust.

In this case, the initial cleaning efficiency signifies the cleaning efficiency at the point where the dust supply amount is smallest (initial cleaning efficiency). In the present test, the cleaning efficiency obtained when a total dust supply amount comes up to 20 g was used as the initial cleaning efficiency. The full-life cleaning efficiency signifies the cleaning efficiency at the point of operating limit of the air filter. In the present test, the cleaning efficiency obtained when the air-flow resistance comes up to 2.94 kPa was used as the full-life cleaning efficiency.

The cleaning efficiency was calculated by a following equation (1).

$$\eta = (A/(A+B)) \times 100 \quad (1)$$

(Where $\eta$ is the cleaning efficiency (%), A is a weight increased amount (g) of the tested air filter, and B is a weight increased amount (g) of the absolute filter.)

[Dust Holding Capacity Test]

The dust holding capacity test was carried out under the same testing conditions as the air-flow resistance test.

The dust holding capacity obtained when the air-flow resistance reaches 2.94 kPa was used as the dust holding capacity (dust life), and was calculated by a following equation (2).

$$C = A = A_2 - A_1 \quad (2)$$

(Where C is the dust holding capacity (g), $A_1$ is a weight (g) of the air filter prior to the test, and $A_2$ is a weight (g) of the air filter after the test. A is the same as the equation (1).

Measured results were given in Table 1.

TABLE 1

|  |  | Example | Comparative Example |
|---|---|---|---|
| JIS-8 Dust | Initial pressure loss (mmAq) | 293 | 247 |
|  | Initial cleaning efficiency (%) | 99.4 | 98.8 |
|  | Fill-life cleaning efficiency (%) | 99.6 | 99.5 |
|  | Dust life (g) | 270 | 135 |
| Carbon Dust | Initial pressure loss (mmAq) | 339 | 313 |
|  | Fill-life cleaning efficiency (%) | 39 | 20 |
|  | Dust life (g) | 18.4 | 5.0 |

As apparent from Table 1, the example exhibits the high carbon dust cleaning efficiency while suppressing the pressure loss low, and exhibits the long dust life against the carbon dust and the JIS-8 dust.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

[Effect]

As mentioned above, in accordance with the filtering element of the present invention, it is possible to improve its dust (particularly, carbon dust) cleaning efficiency and also to enhance its dust holding capacity. Furthermore, the filtering element of the present invention can prolong its filtering lifetime.

What is claimed is:

1. A filter element comprising:
   a first filtering member;
   a second filtering member comprising a ridged structure impregnated with oil disposed on a downstream side of the first filtering member;
   wherein the first filtering member comprises:
   an upstream dry layer that is not impregnated with the oil; and
   a downstream wet layer impregnated with the oil by contact with the second filtering member after assembling the first and second filtering members.

2. The filter element according to claim 1, wherein a density of the first filtering member is less than a density of the second filtering member.

3. The filter element according to claim 2, wherein a density of the first filtering member at an upstream side is greater than a density at the downstream side.

4. The filter element according to claim 1, wherein a density of the first filtering member at an upstream side is greater than a density at the downstream side.

5. The filter element according to claim 1, wherein at least one of the first filtering member and the second filtering member comprises a filter element including a filter paper or a nonwoven fabric.

6. The filter element according to claim 1, wherein the first filtering member comprises a filtering element including a nonwoven fabric, and the second filtering member comprises a filtering element including a filter paper.

7. A filter element comprising:
   a first filtering member comprising a dry layer and a wet layer disposed downstream of the dry layer; and
   a second filtering member comprising a wet ridged structure disposed downstream of the first filtering member.

8. The filter element according to claim 7, wherein the wet layer is configured to absorb an oil disposed on the wet ridged structure.

9. The filter element according to claim 7, wherein the first filtering member is configured to retain larger particles than the second filtering member.

10. The filter element according to claim 7, wherein the first filtering member comprises a first filtering element having a first density and the second filtering member comprises a second filtering element having a second density greater than the first density.

11. The filter element according to claim 10, wherein the first filtering element comprises a nonwoven fabric and the second filtering element comprises a filter paper.

12. The filter element according to claim 7, wherein the wet layer and the wet ridged structure are impregnated with an oil.

13. The filter element according to claim 7, wherein the wet ridged structure is impregnated with an oil, and the wet layer absorbs the oil from the wet ridged structure.

14. The filter element according to claim 7, wherein the dry layer has a first density and the wet layer has a second density less than the first density.

15. The filter element according to claim 7, wherein the first filtering member comprises a flat member.

16. A method of assembling a filter element, comprising:
    providing a first element;
    disposing a second element comprising a ridged structure impregnated with an oil on a downstream side of the first element to transfer the oil from the ridged structure to the downstream side of the first element.

17. The method according to claim 16, wherein the first element is initially free of oil.

18. The method according to claim 16, wherein the second element has a density greater than that of the first element.

19. The method according to claim 16, wherein the first element comprises a nonwoven fabric, and the second element comprises a filter paper.

* * * * *